Patented Jan. 24, 1939

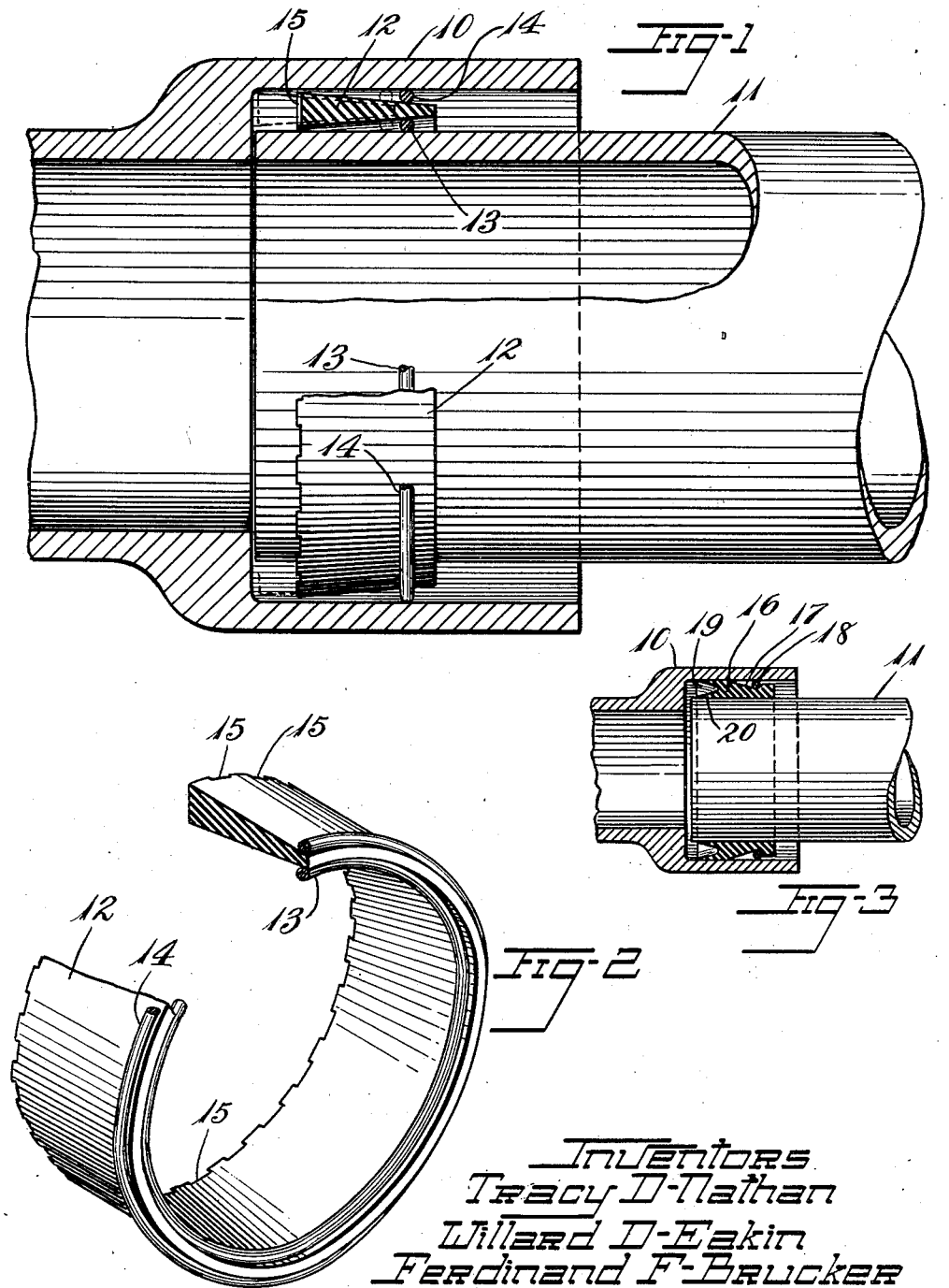

2,145,189

UNITED STATES PATENT OFFICE 2,145,189

DEVICE FOR SEALING AN ANNULAR SPACE

Tracy D. Nathan, Cuyahoga Falls, and Willard D. Eakin and Ferdinand F. Brucker, Akron, Ohio, assignors to The B. F. Goodrich Company, New York, N. Y., a corporation of New York Application April 24, 1936, Serial No. 76,164

7 Claims. (Cl. 285—163)

This invention relates to devices for sealing annular spaces such as the annular space between the bell and the spigot of pipe sections of the bell-and-spigot type.

Its chief objects are to provide an effective seal for fluids at high pressures; to provide for effectively sealing spaces of different dimensions with devices of the same size and character, as in taking care of the tolerances usually allowed in the shape and dimensions of the bells and spigots of bell-and-spigot pipe; and to provide economy of manufacture, ease of assembly, and dependability of operation, in devices of this character.

Of the accompanying drawing:

Fig. 1 is a side elevation, with parts sectioned and broken away, of a sealed bell-and-spigot coupling assembly embodying our invention in its preferred form for that type of assembly.

Fig. 2 is a perspective view of three sealing elements in the relative positions in which they are shown in dotted lines in Fig. 1.

Fig. 3 is a view similar to Fig. 1 but of a modification.

Referring to the drawing, the bell is shown at 10 and the spigot at 11.

The sealing members comprise a ring 12 of wedge-shape in cross-section and a pair of deformable rings 13, 14, preferably of vulcanized rubber composition, adapted to roll upon their annular axes, in contact with the inner, inclined face of the wedge ring 12 and the outer face of the spigot 10, as to the inner rolling ring 13, and in contact with the outer inclined face of the wedge ring 12 and the inner face of the bell 10, as to the outer rolling ring 14, under the pressure of fluid within the pipe assembly, bearing upon the rolling rings and also upon the wedge ring.

To insure against local blowing out of portions of the rolling rings, it is desirable that the wedge ring be of substantial, although not necessarily very great, cross-sectional area at the position of the rolling rings at the beginning as well as at the end of the sealing movement of the wedge ring.

The wedge ring 12 may be of metal, but in that case the inner rolling ring 13 is squeezed more tightly against the spigot than the outer rolling ring 14 is squeezed against the bell, because of the circumferential stretching of the outer rolling ring 14 as it, relatively, moves toward the larger end of the wedge ring.

Consequently, we prefer to make the wedge ring of semi-hard rubber composition, so that it can stretch the very small amount necessary for approximately equalizing the radial compressive forces upon the inner and outer rolling rings.

Otherwise the relatively high compression of the inner rolling ring may stop the wedging, sealing movement of the wedge ring before the outer rolling ring has been gripped with sufficient tightness to prevent it from permitting the escape of fluid at very high pressure, if the faces of the bell and the spigot are cylindrical and the wedge ring has the same angle of bevel on both faces. Also, the flexibility of the semi-hard rubber wedge ring permits the sealing member assembly to conform to bells and spigots that are out-of-round, and also permits portions of the assembly to move slightly ahead of other portions as may be necessary for sealing at all points about the circumference of the pipe-joint.

The rear end of the wedge ring may be notched as at 15 to assure the passage of fluid to all of its surface short of the rolling rings 13, 14, but the imperfection of contour as to the rear end of the ring, the shoulder of the bell and the end face of the spigot normally is sufficient to make any such special provision for the passage of the fluid unnecessary.

In the assembling and operation of the device the wedge ring and the two rolling rings are loosely passed onto the spigot and the spigot is inserted, preferably as far as it will go, into the bell. The wedge ring is then passed along the spigot, in the bell, until it seats against the shoulder of the bell, as shown in dotted lines in Fig. 1. The two rolling rings are then brought to the positions in which they are shown in dotted lines in Fig. 1 and lightly tamped in the tapered spaces on the opposite faces of the wedge ring.

Alternatively the three rings may be first mounted in the bell in the relationship in which they are shown in Fig. 2, and the spigot later inserted. For convenience the rolling rings may be preliminarily lightly cemented to the wedge ring in the positions shown in Fig. 2, with sufficient clearance for the spigot to be inserted without dislodgment and premature rolling of the inner rolling ring 13.

In either case, the parts are assembled with the three rings as shown in dotted lines in Fig. 1, with the rolling rings lightly or somewhat firmly tamped in place, and in the case of a pipe line similar assemblies may be made up at the several joints in the line before the pressure fluid is turned into the line.

Upon the admission of the pressure fluid, it applies pressure to all three of the rings, driving all of them forward, but with the wedge ring moving twice as fast or twice as far as the rolling rings, with a consequent wedging and sealing action, with a gripping of the rolling rings which increases with increase of the pressure, a blowing out of the assembly thereby being prevented.

We do not wholly limit ourselves to any particular hardness of the wedge ring or of the rolling rings, as they may be widely varied to meet varying needs, but in general we prefer that the rolling rings be substantially softer than the wedge ring, since they are required to roll upon their annular axes and in being made sufficiently soft to roll easily they can afford also the deformability which is desirable for effective sealing. For very high pressures, they, as well as the wedge ring, are preferably as hard as is consistent with rolling of the rolling rings and stretching of the wedge ring to compensate stretching and thinning of the outer rolling ring. We do not wholly limit ourselves, however, to a device in which rolling of the sealing members occurs, because, without rolling, they may be so wedged apart by the wedge ring as to perform their sealing function.

In the modification shown in Fig. 3 a ring 16 preferably of vulcanized, semi-hard rubber composition is formed with a single annular bevel 17 on which is adapted to roll with a wedging action a relatively soft rubber ring 18, to stop forward movement of the ring 16, and the ring 16 is formed with flexible annular sealing lips 19, 20 adapted to seal against the faces of the bell and spigot respectively.

When a metal wedge ring is used it can be formed with a "slower" taper on its inner face than on its outer face, to compensate for the stretching and consequent thinning of the outer rolling ring as it moves, relatively, toward the large end of the wedge ring.

The rolling rings can be made hollow, so as to flatten readily, and provided internally with a lubricant, such as glycerine, so as to roll easily in their flattened condition, this expedient providing for greater stability against cramping of the wedge ring and for greater area of sealing contact and avoiding deterioration of extensive regions of the rubber resulting from tension of its outer surfaces incident to distortion.

The device as described attains, in high degree, the objects above set out.

We claim:

1. Means for sealing an annular space between concentric fluid-conducting members, said means comprising an annular sealing member of less radial extent than the space and tapered axially, said member being unguided by at least one of the walls of the space and being adapted to be forced along the space by pressure of the fluid within the members independently of relative axial movement of said fluid-conducting members, and sealing means comprising a rollable resilient annular packing member between an axial face of the sealing member and an axial face of one of the fluid-conducting members.

2. Means for sealing an annular space between concentric fluid-conducting members, said means comprising an annular sealing member of less radial extent than the space and tapered axially, said member being adapted to be forced along the space by pressure of the fluid within the members without contact with the walls of the space and independent of relative axial movement of said fluid-conducting members, and a pair of rollable resilient annular packing members, one between each face of the sealing member and the opposed face of the fluid conducting member.

3. Means for sealing an annular space between concentric fluid-conducting members, said means comprising a flexible annular sealing member of less radial extent than the space and tapered axially, said member being adapted to be forced along the space by pressure of the fluid within the members, and sealing means comprising a rollable resilient annular packing member between an axial face of the sealing member and an axial face of one of the fluid-conducting members.

4. Means for sealing an annular space between concentric fluid-conducting members, said means comprising a flexible annular sealing member of less radial extent than the space and tapered axially, said member being adapted to be forced along the space by pressure of the fluid within the members, and sealing means comprising a pair of rollable resilient annular packing members each between an axial face of the sealing member and an axial face of one of the fluid conducting members.

5. Means for sealing the annular space between inner and outer radially spaced-apart members, said means comprising an annular flexible gasket element adapted to be advanced axially in said space relative to both the inner and outer members under the force of fluid pressure from within the members, a face of said element providing with the surface of the adjacent member an annular wedging space, and a flexible sealing ring having a cross-sectional shape such that it is adapted under the advance of the gasket element to be rolled in contact with said element and the wall of the adjacent member into sealing position in said wedging space.

6. Means for sealing the annular space between inner and outer radially spaced-apart members, said means comprising an annular stretchable gasket element adapted to be advanced axially in said space relative to said members, the radially inner and outer faces of said element providing with the walls of said members a pair of wedging spaces, and a pair of flexible sealing rings at said faces adapted under the advance of said gasket element to be rolled in contact with said element and the walls of said members into sealing positions in said wedging spaces, said gasket element by virtue of its stretchable character being adapted to equalize the radial compressive forces upon the inner and outer rings.

7. Means for sealing the annular space between inner and outer radially spaced-apart pipe members, said means comprising an annular gasket of stretchable rubber-like material adapted to be advanced axially in said space relative to said members under the force of fluid pressure from within said members, the radially inner and outer faces of said element being tapered with the thinner portion of the element foremost to provide annular wedging spaces with the walls of said members, and a pair of sealing rings of resilient rubber-like material adapted under the advance of said gasket element to be rolled in contact with said element and the walls of said members into sealing positions in said wedging spaces, said gasket element by virtue of its stretchable character being adapted to equalize the radial compression forces upon the inner and outer rings.

TRACY D. NATHAN.
WILLARD D. EAKIN.
FERDINAND F. BRUCKER.